United States Patent
Gunjan

(10) Patent No.: US 9,449,221 B2
(45) Date of Patent: Sep. 20, 2016

(54) SYSTEM AND METHOD FOR DETERMINING THE CHARACTERISTICS OF HUMAN PERSONALITY AND PROVIDING REAL-TIME RECOMMENDATIONS

(71) Applicant: Abhishek Gunjan, Gaya (IN)

(72) Inventor: Abhishek Gunjan, Gaya (IN)

(73) Assignee: WIPRO LIMITED, Bangalore (IN)

( * ) Notice: Subject to any disclaimer, the term of this patent is extended or adjusted under 35 U.S.C. 154(b) by 37 days.

(21) Appl. No.: 14/273,121

(22) Filed: May 8, 2014

(65) Prior Publication Data

US 2015/0278590 A1   Oct. 1, 2015

(30) Foreign Application Priority Data

Mar. 25, 2014   (IN) .......................... 1573/CHE/2014

(51) Int. Cl.
*G06K 9/00* (2006.01)
*G06Q 30/02* (2012.01)
*G06N 7/00* (2006.01)
*G06N 99/00* (2010.01)

(52) U.S. Cl.
CPC ....... *G06K 9/00362* (2013.01); *G06K 9/00248* (2013.01); *G06K 9/00281* (2013.01); *G06K 9/00315* (2013.01); *G06K 9/00348* (2013.01); *G06N 7/005* (2013.01); *G06N 99/005* (2013.01); *G06Q 30/02* (2013.01)

(58) Field of Classification Search
None
See application file for complete search history.

(56) References Cited

U.S. PATENT DOCUMENTS

| | | |
|---|---|---|
| 5,933,527 A | 8/1999 | Ishikawa |
| 6,879,709 B2 | 4/2005 | Tian et al. |
| 7,036,094 B1 | 4/2006 | Cohen et al. |
| 7,848,544 B2 | 12/2010 | Mariani |
| 7,885,902 B1 * | 2/2011 | Shoemaker et al. .......... 705/319 |
| 8,010,402 B1 * | 8/2011 | Sharma et al. ............... 705/7.29 |
| 8,038,614 B2 | 10/2011 | Gobeyn et al. |
| 8,488,023 B2 | 7/2013 | Bacivarov et al. |
| 2006/0143647 A1 * | 6/2006 | Bill ................................ 725/10 |
| 2007/0003914 A1 * | 1/2007 | Yang ............................. 434/236 |
| 2007/0033050 A1 * | 2/2007 | Asano et al. ................. 704/270 |
| 2007/0245379 A1 * | 10/2007 | Agnihortri ...................... 725/46 |
| 2008/0002892 A1 * | 1/2008 | Jelonek et al. ............... 382/224 |
| 2008/0260212 A1 | 10/2008 | Moskal et al. |

(Continued)

FOREIGN PATENT DOCUMENTS

WO   WO 2012139242 A1 * 10/2012

OTHER PUBLICATIONS

Cohen, Ira, Ashutosh Garg, and Thomas S. Huang. "Emotion recognition from facial expressions using multilevel HMM." In Neural information processing systems, vol. 2. 2000.*

(Continued)

*Primary Examiner* — Sumati Lefkowitz
*Assistant Examiner* — Carol Wang
(74) *Attorney, Agent, or Firm* — Finnegan, Henderson, Farabow, Garrett & Dunner, LLP

(57) ABSTRACT

The present disclosure relates to systems, methods, and non-transitory computer-readable media for identifying a personality of a human subject based on correlations between personality traits obtained from the subject's physical features, which may include a movement pattern of the subject, such as the subject's gait. Embodiments in accordance with the present disclosure are further capable of providing a recommendation to the subject for a product or service based on the identified personality of the subject.

27 Claims, 5 Drawing Sheets

(56) References Cited

U.S. PATENT DOCUMENTS

| | | |
|---|---|---|
| 2008/0292151 A1 | 11/2008 | Kurtz et al. |
| 2009/0299814 A1* | 12/2009 | Grigsby et al. ................ 705/10 |
| 2011/0134026 A1* | 6/2011 | Kang et al. .................... 345/156 |
| 2012/0002848 A1* | 1/2012 | Hill ........................ A61B 5/164 382/118 |
| 2012/0288170 A1* | 11/2012 | McVey .................... G06K 9/52 382/128 |
| 2013/0259333 A1 | 10/2013 | Mcvey |
| 2013/0344464 A1 | 12/2013 | Mychals |
| 2014/0022370 A1* | 1/2014 | Sohn ................. G06K 9/00315 348/78 |
| 2014/0112556 A1* | 4/2014 | Kalinli-Akbacak .... G10L 25/63 382/128 |
| 2014/0359439 A1* | 12/2014 | Lyren ........................... 715/705 |

OTHER PUBLICATIONS

Biel, Joan-Isaac, Lucia Teijeiro-Mosquera, and Daniel Gatica-Perez. "FaceTube: predicting personality from facial expressions of emotion in online conversational video." In Proceedings of the 14th ACM international conference on Multimodal interaction, pp. 53-56. ACM, 2012.*

* cited by examiner

SYSTEM AND METHOD FOR DETERMINING THE CHARACTERISTICS OF HUMAN PERSONALITY AND PROVIDING REAL-TIME RECOMMENDATIONS

PRIORITY CLAIM

This disclosure claims priority under 35 U.S.C. §119 to: India Application No. 1573/CHE/2014, filed Mar. 25, 2014, and entitled "SYSTEM AND METHOD FOR DETERMINING THE CHARACTERISTICS OF HUMAN PERSONALITY AND PROVIDING REAL-TIME RECOMMENDATIONS." The aforementioned application is incorporated herein by reference in its entirety for all purposes.

DESCRIPTION

Businesses and other groups have focused intensely on determining patterns of human behavior as a key driver of consumer demand and product usage. To this end, psychometric techniques have been used to provide a prediction of an individual's personality based on one or more physical features of an individual. For example, psychometric analysis of the shape of an individual's mouth may be used to classify the individual as having a certain personality archetype. A business may make certain assumptions about that personality archetype to tailor their sales and marketing efforts to individuals having personalities highly receptive to that business's products or services.

Current systems and methods for identifying an individual's personality are largely based on coarse demographic measures such as an individual's age or gender. Thus, for example, television marketing is commonly segmented out by age and gender such that even at the stage of conception, a television program is geared to a certain demographic. But demographic patterns do not take into account variations among individuals within a demographic that, in the aggregate, have a significant impact on whether a given product or service will succeed in the demographic. On the other end of the spectrum, current systems and methods for identifying an individual's personality using psychometric analysis may be narrowly focused on one or two of the individual's physical features as measure of the individual's personality. But these systems and methods are not able to correlate personality traits between features, which diminishes the accuracy of the predicted personality. Whether based on demographics or psychometrics, current systems are not adequately designed to provide real-time information that businesses require to support their everyday consumer-oriented transactions. Thus, current systems and methods for predicting an individual's personality do not take into account business intelligence on consumer behavior that would permit organizations to tailor their marketing efforts to particular individuals.

Accordingly, embodiments in accordance the present disclosure provide for systems, methods, and non-transitory computer-readable media for identifying a personality of a human subject that take into account correlations between personality traits obtained from the subject's physical features, which may include a movement pattern of the subject, such as the subject's gait. Embodiments in accordance with the present disclosure are further capable of providing a recommendation to the subject for a product or service based on the identified personality of the subject.

SUMMARY

Certain embodiments of the present disclosure relate to a system for identifying a personality of a human subject comprising one or more hardware processors and a computer-readable medium storing instructions that, when executed by the one or more hardware processors, cause the one or more hardware processors to perform operations. The operations may comprise receiving visual data of the human subject from one or more hardware sensors and validating the visual data using a facial recognition algorithm. The operations may also comprise detecting at least one anatomical feature of the human subject from the visual data by locating a physical region corresponding to each of the at least one anatomical feature in the visual data, extracting a geometrical representation of each of the at least one anatomical feature from the physical region, and associating a first personality factor with each of the at least one anatomical feature. The first personality factor may be determined based on the geometrical representation of the anatomical feature. The operations may also comprise determining the personality of the human subject based on the first personality factor associated with each of the detected at least one anatomical feature. Validating the visual data may further comprise determining a gender of the human subject based on a support vector machine algorithm.

In certain embodiments, the operations may further comprise extracting at least one movement pattern of the human subject from the visual data, and associating a second personality factor with each of the extracted at least one movement pattern. Determining the personality of the human subject may comprise determining the personality of the human subject based on the first personality factor associated with each of the detected at least one anatomical feature and the second personality factor associated with each of the extracted at least one movement pattern. The at least one movement pattern may include a gait of the human subject, and the second personality factor associated with each of the extracted at least one movement pattern may be determined based on a hidden Markov model algorithm. The first personality factor and second personality factor may comprise one or more personality traits, and the personality of the human subject may be determined based on correlations between the personality factors associated with each of the detected at least one anatomical feature and each of the extracted at least one movement pattern. The correlations may be obtained from the one or more personality traits.

In certain embodiments, the operations may further comprise providing a real-time recommendation for a product to the human subject based on the determined personality of the human subject. The operations may further comprise receiving feedback via a computing device associated with the human subject, and improving the real-time recommendation based on at least a machine-learning algorithm and the received feedback. The received feedback may comprise an amount of time the human subject observed the recommendation for the product.

Embodiments of the present disclosure also relate to a non-transitory computer-readable medium storing instructions for identifying a personality of a human subject that, when executed by the one or more hardware processors, cause the one or more hardware processors to perform operations. The operations may comprise receiving visual data of the human subject from one or more hardware sensors, validating the visual data using a facial recognition algorithm, and detecting at least one anatomical feature of the human subject from the visual data. Detecting the at least one anatomical feature of the human subject may comprise locating a physical region corresponding to each of the at least one anatomical feature in the visual data, extracting a geometrical representation of each of the at least one anatomical feature from the physical region, and associating a first personality factor with each of the at least one anatomical feature (based on the geometrical representation of the anatomical feature), and determining the personality of the human subject based on the first personality factor associated with each of the detected at least one anatomical feature. Validating the visual data may further comprise determining a gender of the human subject based on a support vector machine algorithm.

In certain embodiments, the operations may further comprise extracting at least one movement pattern of the human subject from the visual data, and associating a second personality factor with each of the extracted at least one movement pattern. Determining the personality of the human subject may comprise determining the personality of the human subject based on the first personality factor associated with each of the detected at least one anatomical feature and the second personality factor associated with each of the extracted at least one movement pattern. The at least one movement pattern may include a gait of the human subject, and the second personality factor associated with each of the extracted at least one movement pattern may be determined based on a hidden Markov model algorithm. The first personality factor and second personality factor may comprise one or more personality traits, and the personality of the human subject may be determined based on correlations between the personality factors associated with each of the detected at least one anatomical feature and each of the extracted at least one movement pattern, the correlations being obtained from the one or more personality traits.

In certain embodiments, the operations may further comprise providing a real-time recommendation for a product to the human subject based on the determined personality of the human subject. The operations may further comprise receiving feedback via a computing device associated with the human subject, and improving the real-time recommendation based on at least a machine-learning algorithm and the received feedback. The received feedback may comprise an amount of time the human subject observed the recommendation for the product.

Embodiments of the present disclosure also relate to a method for identifying a personality of a human subject. The method may include receiving, using one or more hardware processors, visual data of the human subject from one or more hardware sensors. The method may also include validating, using one or more hardware processors, the visual data using a facial recognition algorithm. The method may also include detecting, using one or more hardware processors, at least one anatomical feature of the human subject from the visual data. Detecting the at least one anatomical feature of the human subject may comprise locating a physical region corresponding to each of the at least one anatomical feature in the visual data, extracting a geometrical representation of each of the at least one anatomical feature from the physical region, and associating a first personality factor with each of the at least one anatomical feature. The first personality factor may be determined using the geometrical representation of the anatomical feature. The method may also include determining, using one or more hardware processors, the personality of the human subject based on the first personality factor associated with each of the detected at least one anatomical feature. Validating the visual data may further comprise determining a gender of the human subject based on a support vector machine algorithm.

In certain embodiments, the operations may further comprise extracting at least one movement pattern of the human subject from the visual data, and associating a second personality factor with each of the extracted at least one movement pattern. Determining the personality of the human subject may comprise determining the personality of the human subject based on the first personality factor associated with each of the detected at least one anatomical feature and the second personality factor associated with each of the extracted at least one movement pattern. The at least one movement pattern may include a gait of the human subject, and the second personality factor associated with each of the extracted at least one movement pattern may be determined based on a hidden Markov model algorithm. The first personality factor and second personality factor may comprise one or more personality traits, and the personality of the human subject may be determined based on correlations between the personality factors associated with each of the detected at least one anatomical feature and each of the extracted at least one movement pattern, the correlations being obtained from the one or more personality traits.

In certain embodiments, the operations may further comprise providing a real-time recommendation for a product to the human subject based on the determined personality of the human subject. The operations may further comprise receiving feedback via a computing device associated with the human subject, and improving the real-time recommendation based on at least a machine-learning algorithm and the received feedback. The received feedback may comprise an amount of time the human subject observed the recommendation for the product.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

BRIEF DESCRIPTION OF THE DRAWINGS

The accompanying drawings, which constitute a part of this specification, illustrate several embodiments and, together with the description, serve to explain the disclosed principles. In the drawings.

DETAILED DESCRIPTION

As used herein, reference to an element by the indefinite article "a" or "an" does not exclude the possibility that more than one of the element is present, unless the contextually requires that there is one and only one of the elements. The indefinite article "a" or "an" thus usually means "at least one." The disclosure of numerical ranges should be understood as referring to each discrete point within the range, inclusive of endpoints, unless otherwise noted.

As used herein, the terms "comprise," "comprises," "comprising," "includes," "including," "has," "having," "contains," or "containing," or any other variation thereof, are intended to cover a non-exclusive inclusion. For example, a composition, process, method, article, system, apparatus, etc. that comprises a list of elements is not necessarily limited to only those elements but may include other elements not expressly listed. The terms "consist of," "consists of," "consisting of," or any other variation thereof, excludes any element, step, or ingredient, etc., not specified. The term "consist essentially of," "consists essentially of," "consisting essentially of," or any other variation thereof, permits the inclusion of elements, steps, or ingredients, etc., not listed to the extent they do not materially affect the basic and novel characteristic(s) of the claimed subject matter.

Figure 1:
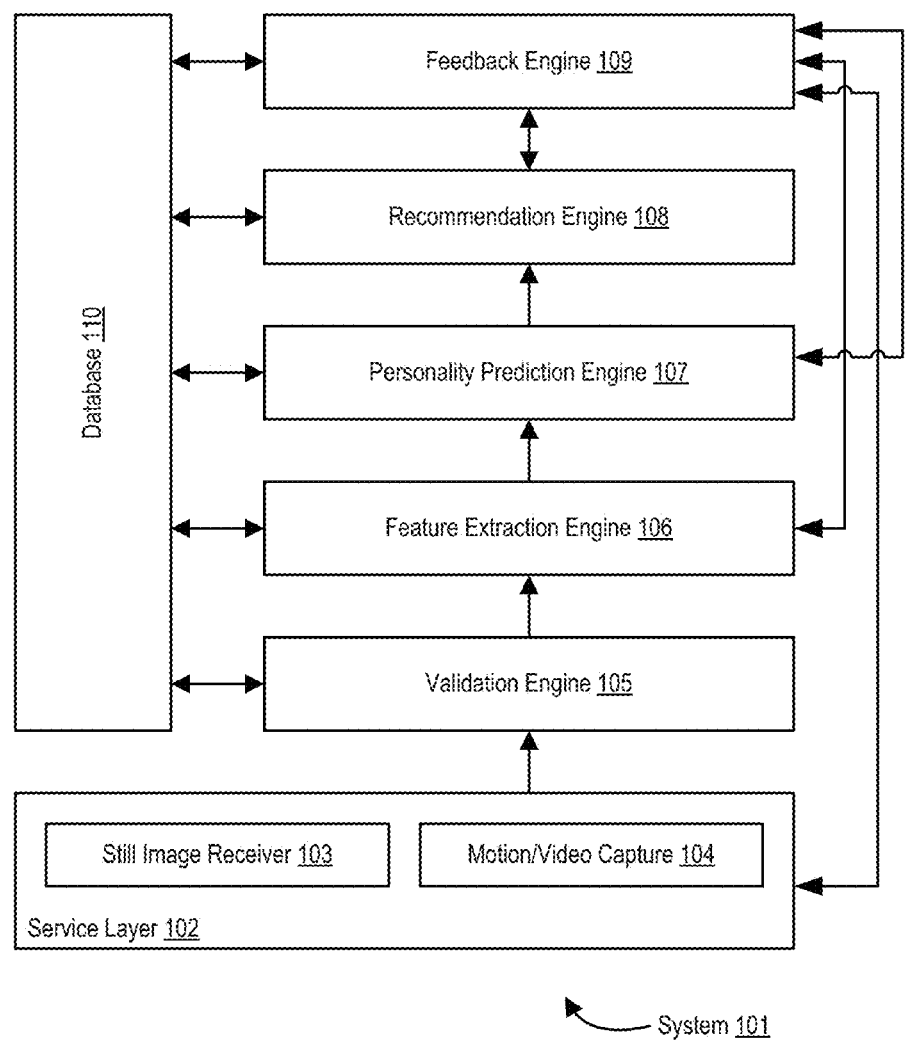
FIG. 1 is a block diagram of a high-level architecture of an exemplary system in accordance with the present disclosure.
Figure 2:
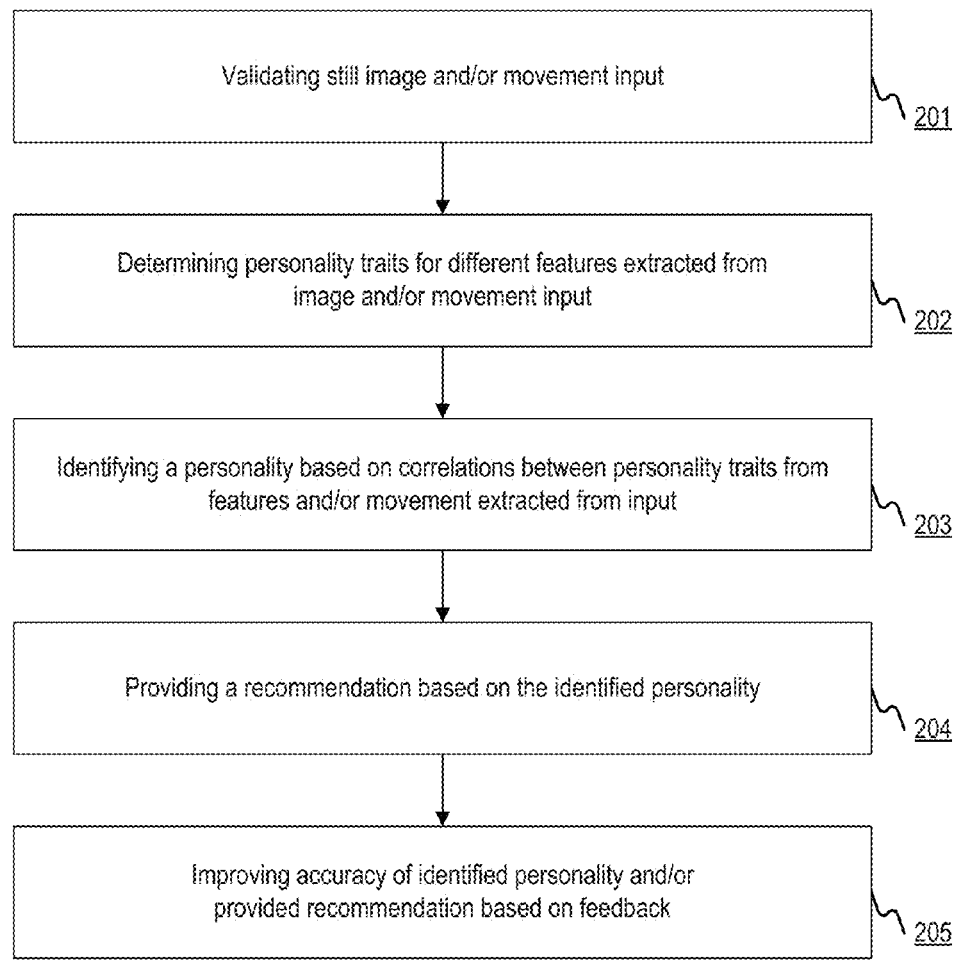
FIG. 2 is a flowchart of an exemplary method for identifying a personality of a human subject in accordance with certain embodiments of the present disclosure.

FIG. 1 is a block diagram of a high-level architecture of an exemplary system 101 in accordance with the present disclosure comprising a Service Layer 102, a Validation Engine 105, a Feature Extraction Engine 106, a Personality Prediction Engine 107, a Recommendation Engine 108, a Feedback engine 109, and a database 110. The architecture shown in FIG. 1 may be implemented using one or more hardware processors (not shown), and a computer-readable medium storing instructions (not shown) configuring the one or more hardware processors; the one or more hardware processors and the computer-readable medium may also form part of the system 101. FIG. 2 is a flowchart of an exemplary method for identifying a personality of a human subject in accordance with certain embodiments of the present disclosure that may be executed by system 101 as described in further detail below. It is noted however, the functions and/or steps of FIG. 2 as implemented by system 101 may be provided by different architectures and/or implementations without departing from the scope of the present disclosure.

Validation of Visual Data

Figure 3:
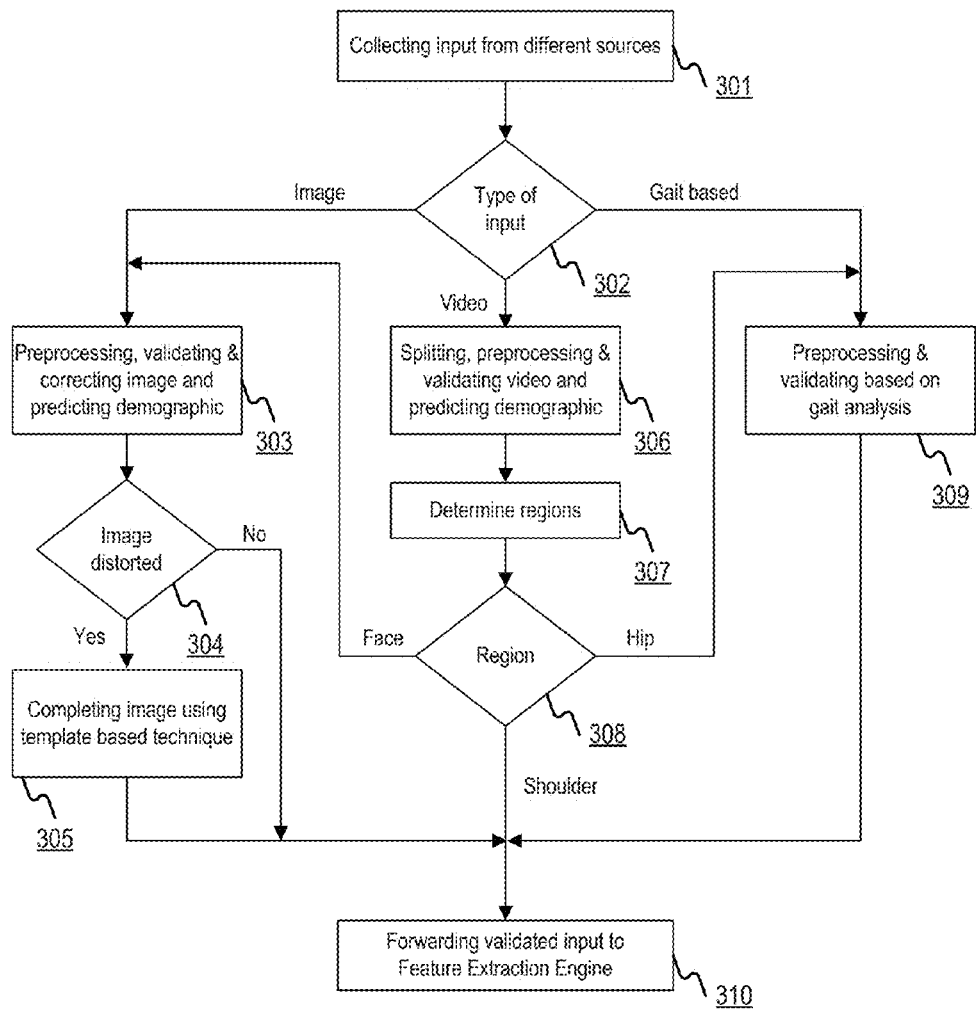
FIG. 3 is a flowchart of an exemplary method for validating input in the method shown in FIG. 2.

As shown in FIG. 2 step 201, a method in accordance with the present disclosure may include validating visual data comprising still image and/or movement input. An exemplary method for validating visual data is shown as a flowchart in FIG. 3, and may include collecting visual data from one or more sources as shown in step 301. Such input may be collected by Service Layer 102 of system 101, and may comprise one or more still images received by a still image receiver 103 and/or motion/video data received by a motion/video capture device 104. Still image receiver 103 or motion/video capture device 104 may include a camera, a video recorder (e.g., a web cam), and/or motion-capture system, etc. In certain embodiments, still image receiver 103 and motion/video capture device 104 may be the same, and both still image and/or movement input may be received using a single device or system.

Service Layer 102 may format the still image and/or movement input received by still image receiver 103 and/or motion video data capture device 104 for storage in a computer-readable medium, for example, as JPEG, PNG, BMP, GIF, TIFF, RAW, MPEG, MP4, H264, etc. Visual data comprising the formatted still image and/or movement input may be stored in database 110—however, as shown in FIG. 1, in certain embodiments in accordance with the present disclosure, Service Layer 102 may only store visual data locally and/or temporarily instead of using longer-term storage in database 110 for legal and/or privacy concerns. Service Layer 102 may collect visual data in a substantially real-time fashion, for example capturing either a live feed or stream, or may receive precaptured or prerecorded visual data from a client device. In certain embodiments, Service Layer 102 may receive visual data remotely using a file transfer protocol, for example as an upload from a remote client still image receiver 103 or remote motion/video capture device 104.

As shown in step 302, validating visual data may include determining the type of the input data, for example as either still image input (step 302; "Image"), video input (step 302; "Video"), or gait-based input (step 302; "Gait based"). Gait-based input includes visual data that encapsulates a movement pattern of a subject, in particular, a subject's gait. Gait-based input may be obtained from motion-capture data or video input collected in step 301 by Service Layer 102. Validation Engine 105 of system 101 may determine the type of input data based on, for example, the file format of the visual data, e.g., the file extension and/or metadata associated with the format.

If Validation Engine 105 determines that the visual data comprises still image input (step 302; "Image"), validating visual data may comprise, as shown in step 303, a preprocessing step that converts the still image input into, for example, a grayscale image and/or an edge image. Alternatively or additionally, validating the still image input may include determining whether the still image input contains a human face based on a facial recognition algorithm. Alternatively or additionally, validating the still image input may include tilt correcting and/or normalizing the still image input, for example, by aligning an axis of the detected face. Alternatively or additionally, validating the still image input may include determining one or more demographic attributes of the human subject based on the still image. The preprocessing step performed by Validation Engine 105 may convert the still image input into a format more suitable for further analysis and/or correction, e.g., face detection and/or tilt correction. Thus, for example, Validation Engine 105 may preprocess still image input by desaturating the still image input to produce a grayscale image. Validation Engine 105 may also use an edge detection algorithm that, for example, determines an edge image based on contrast levels in the still image input. Other operations may be performed during preprocessing, such as resizing the still image input to satisfy certain minimum or maximum resolution requirements or reformatting the still image input from one format to another.

Based on the still image input and/or converted images obtained by preprocessing the still image input, Validation Engine 105 may validate the still image input by, for example, detecting if the still image input contains an image (or partial image) of a human face using a facial recognition algorithm. If a human face (or part of a human face) is detected, signifying that the still image input includes information about a human subject, then validating the image may further comprise tilt correcting the image, for example, by aligning one or more axes of the detected face with one or more central axes. Additionally or alternatively, validating the image may comprise or resizing and/or normalizing the still image data based on a detected facial feature. Thus, for example, Validation Engine 105 may use a facial recognition algorithm to detect that a still image input from Service Layer 102 contains a human face. If Validation Engine 105 determines that the still image input does not contain a human face, it may delete the still image input and/or request other visual data from Service Layer 102 for validation. If Validation Engine 105 determines instead that the still image input contains a human face, it may use a facial recognition algorithm to determine the height of the detected face's nose, align the axis defining the height of the nose with a central axis (e.g., centering and rotating the still image input), and normalize the still image input such that the height the face's nose has unit length.

Validation Engine 105 may predict or determine one or more demographic attributes of the human subject (e.g., age, gender, and/or race) using one or more support vector machine algorithms. The accuracy of the predicted or determined one or more demographic attributes may be improved if the one or more support vector machine algorithms share dependencies, such that Validation Engine 105 may determine which support vector machine algorithm to use based on a demographic attribute determined by another support vector machine algorithm. Thus, for example, Validation Engine 105 may use a facial recognition algorithm to determine if still image input contains a human face. If the facial recognition algorithm determines that a human face is present in the still image, Validation Engine 105 may use a first support vector machine algorithm trained to distinguish between male and female faces to determine a gender of the human subject. If the first support vector machine algorithm determines that the human subject is male, Validation Engine 105 may use a second support vector machine algorithm trained to distinguish between difference races of male faces to determine a race of the human subject. If instead the first support vector machine algorithm determines that the human subject is female, Validation Engine 105 may use a third support vector machine algorithm trained to distinguish between difference races of female faces to determine a race of the human subject. Finally, Validation Engine 105 may use a fourth support vector machine algorithm to determine an age or age range of the human subject.

Validating visual data may include determining if the visual data comprises a distorted still image (step 304) and if so (step 304; "Yes"), using template-based techniques to correct the image (step 305). For example, Validation Engine 105 may determine if still image input is distorted based on whether one or more facial features may be detected. If a feature is not detected—for example if the facial recognition fails to detect two eyes or fails to detect a portion of the a nose—Validation Engine 105 may determine that the still image data is distorted (step 304; "Yes"). In step 305, Validation Engine may attempt to correct the distortion by completing the still image input based on symmetry rules and other detected features or other partially detected features, modifying the still image by reconstructing the missing features. As another example, Validation Engine 105 may detect that one or more facial axes of a face detected using a facial recognition algorithm fail to align (step 304; "Yes")—for example, if an axis of the eyes in a detected face fails to be substantially perpendicular to the axis formed by the center of the nose and the center of the mouth. Validation Engine may then apply a deskewing algorithm on the still image input in step 305 to realign the detected facial features.

In certain embodiments, using template-based techniques to correct distorted still image input may include correcting a distorted facial feature in the still image input. Correcting a distorted facial feature may comprise extracting a first field corresponding to peaks in image intensity of the distorted facial feature, extracting a second field corresponding to valleys in image intensity of the distorted facial feature, and extracting a third field corresponding to edges of image intensity (e.g., rapid changes in image intensity) of the distorted facial feature. Image intensity may correspond to, for example, a grayscale intensity in preprocessed still image input. Correcting a distorted facial feature may further comprise using an image potential function that determines, based on the first, second, and third fields and one or more template variables associated with the facial feature, a potential associated with the distorted facial feature where the minima of the image potential function defines the most likely set of template variables associated with the facial feature. Template variables, along with one or more mapping functions associated with a facial feature, may define a geometrical representation of the feature. For example, template variables associated with an eye may include a coordinate $(x_c, y_c)$ and a radius r that define a geometrical representation of the iris of the eye using the mapping function $r<=sqrt((x-xc)^2+(y-yc)^2)$. Using these template variable, Validation Engine 105 may correct a distorted eye by finding a set of template variables that minimize the image potential function using, for example, an iterative optimization algorithm, e.g., a hill climbing algorithm. For example, a component of the image potential function associated with an eye may be equal to the negative area integral over the circle defined by $x_c$, $y_c$, and r, of the first field corresponding to peaks in image intensity. Minimizing the image potential function attempts to determine $x_c$ and r in the distorted image such that $x_c$, $y_c$, and r occur over an region of image intensity that best approximates a dark circle, which corresponds to most likely shape of an iris in a grayscale image of an eye.

Validation Engine 105 may determine that visual data from Service Layer 102 comprises video input (step 302; "Video"). Video input may comprise one or more still images or frames having a sequence, and a frequency comprising a number of still images or frames recorded per unit of time, e.g., 30 frames per second. Validating visual data comprising video input may comprise splitting the video input into one or more still images or frames of uniform interval, as shown in step 306. For example, Validation Engine 105 may split the video input into segments having five frames each or into segments having duration of five seconds each based on the frequency of the video input. Validation Engine 105 may also preprocess the video input in step 306 using, for example, steps analogous to those for preprocessing still image input in step 303. Thus, Validation Engine 105 may convert the one or more still image/frames or segments into a format more suitable for further analysis and/or correction (e.g., by desaturating the frames and/or segments to provide grayscale frames and/or segments, or using edge detection algorithms to provide edges images and/or segments).

Validation Engine 105 may further validate the video input by detecting if the one or more frames and/or segments contains an image (or partial image) of a human face using a facial recognition algorithm, signifying that the video input includes information about a human subject. If a human face (or part of a human face) is detected, then validating the video input may further comprise predicting or determining one or more demographic attributes of the human subject (e.g., age, gender, and/or race) using one or more support vector machine algorithms, in a manner analogous to the prediction or determination of one or more demographic attributes applied to still image input in step 303. The one or more support vector machine algorithms may be configured by Validation Engine 105 to predict or determine the one or more demographic attributes based on individual frames or a statistical sampling of frames in the video input.

Video input may be further processed by Validation Engine 105 to determine one or more regions in the video input corresponding to a physical region of a human subject, for example a face region, a shoulder region, and a hip region, in step 307. For example, in a single frame of video input, Validation Engine 105 may use a facial recognition algorithm to determine a face region delineated by a two-dimensional polygon, e.g., a rectangle, whose vertices or edges correspond to facial features of the human subject. The rectangle, for example, may be have edges whose midpoints correspond to the peak of the human subject's forehead, and the inflection/maxima/minima points of the contours formed by the human subject's chin and cheeks. Validation Engine 105 may determine a face region in each frame of the video input, thus determining a face region in the video input. Similarly, Validation Engine 105 may use image processing algorithms, e.g. template-matching algorithms, to determine a hip region and shoulder region in the video input, for example, by determining a hip region and shoulder region in each frame of the video input. The one or more regions in the video input may be further validated as still image input or gait-based input. Thus, Validation Engine 105 my further validate each frame of a face region (step 308, "Face") as still image input using steps 303, 304, 305. Validation Engine 105 may further validate the hip region in the video input as gait-based-input (step 308; "Hip"), discussed infra.

Gait-based input collected by Service Layer 102 may be validated in step 309 using gait-based analysis. Gait-based input may comprise visual data that encapsulates a movement pattern of a subject. In certain embodiments, gait-based input may include motion capture data of a subject comprising a "ball-and-stick" model defined by one or more points corresponding to joints of the subject, one or more connections between the one or more points corresponding to limbs of the subject (the magnitude of the connection corresponding to the limb length or apparent limb length), and angles formed by the one or more connections.

In certain embodiments, motion capture data may be extracted from video input, for example, from the hip region of a video input received by Service Layer 102. Thus, in step 309, Validation Engine 105 may use gait-based analysis to validate and preprocess a hip region in video input determined in step 307 as gait-based input. Validation Engine 105 may validate the hip region video input using one or more support vector machine algorithms to determine if a movement pattern in the hip region corresponds to a human movement pattern. If so, Validation Engine 105 may pre-process the hip region video input to extract motion capture data. Thus, in certain embodiments, Validation Engine 105 may extract a frame of motion capture data for each frame in the hip region video input by assigning one or more points corresponding to a joint, e.g., a right hip socket, a left hip socket, a midpoint of the pelvis, a right knee, a left knee, a right ankle, and/or a left ankle using, for example, an image recognition algorithm (e.g., a template-matching algorithm). Validation Engine 105 may assign one or more connections between the one or more points, e.g., a connection between a point corresponding to a right hip socket and a point corresponding to a right knee, and a connection between the point corresponding to the right knee, and a point corresponding to a right ankle. Validation Engine 105 may associate each connection with a magnitude based on a distance, between the connected points, and may determine one or more joint angles formed by the one or more connections. A frame of motion capture data may thus comprise the one or more points corresponding to a joint, the one more connections between the one or more points, the magnitude associated with each connection, and/or the one or more joint angles.

In step 310, validated visual data comprising validated still image input, video input, and/or gait-based input may be forwarded by Validation Engine 105 to Feature Extraction Engine 106 for further analysis, for example, by storing the validated visual data in database 110 along with associated metadata, e.g., the predicted or determined one or more demographic attributes, one or more template variables used to correct distorted still image input, and/or metadata describing the determined one or more regions in the video input data, etc.

Feature Extraction and Personality Trait Determination

As shown in FIG. 2 step 202, a method in accordance with the present disclosure may include determining one or more personality traits for features extracted from the visual data comprising still image and/or movement input. Thus, embodiments in accordance with the present disclosure may detect at least one anatomical feature of a human subject from the visual data, for example, by locating a physical region corresponding to the anatomical feature in the visual data, and extracting a geometrical representation of the anatomical feature. Based on the geometrical representation of the anatomical feature, a personality factor comprising one or more personality traits may be determined. Certain embodiments in accordance with the present disclosure may also extract a movement pattern of the human subject from the visual data and determine a personality factor that may comprise one or more personality traits based on the movement pattern.

Figure 4:
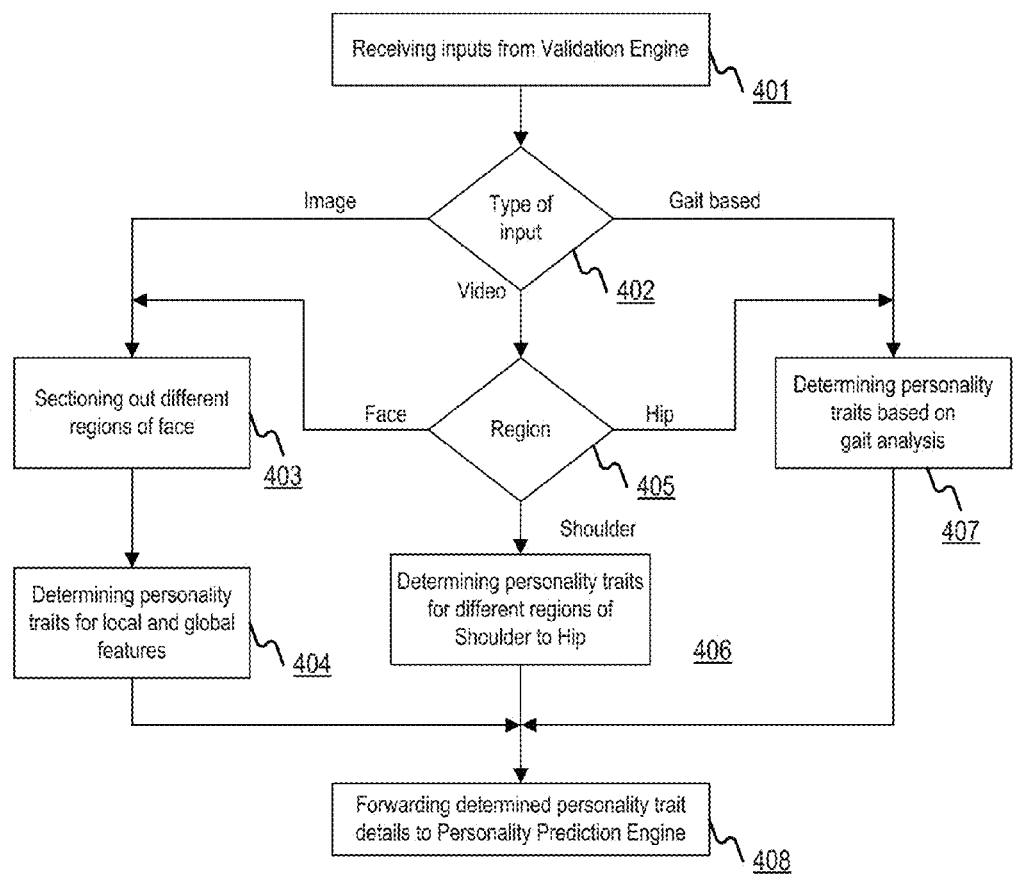
FIG. 4 is a flowchart of an exemplary method for determining personality traits of personality factor associated with a physical feature of the subject.

An exemplary method for determining one or more personality traits for features extracted from the visual data comprising still image and/or movement input using system 101 is shown as a flowchart in FIG. 4. In step 401, Feature Extraction Engine 106 may receive validated input from Validation Engine 105 including validated visual data comprising validated still image input, video input, and/or gait-based input. Feature Extraction Engine 106 may, for example, retrieve the validated visual data from database 110. Feature Extraction Engine 106 may determine a type of the validated visual data in step 402, for example as validated still image input (step 402; "Image"), validated video input (step 402, "Video"), or validated gait-based input (step 402; "Gait based").

If the validated visual data comprises validated still image input (step 402, "Image"), in step 403, Feature Extraction Engine 106 may detect one or more anatomical features of the human subject by, for example, sectioning a face of the human subject using a facial recognition algorithm to determine one or more physical regions corresponding to the one or more anatomical features. The physical regions and corresponding anatomical features may include at least one of a chin region, a jaw region, a lip region, a voice-box region, a mouth region, a cheek region, a nose region, an eye region, an eyelash region, an eyebrow region, a forehead region, a head region, a hair region, an ear region, a cheek dimple region, a chin dimple region, a teeth region, a gum region and/or a tongue region, etc. A physical region corresponding to an anatomical feature may, in certain embodiments, be further subdivided into subregions. For example, a lip region may be divided into an upper lip region, a lower lip region, a philtrum region, a left lip corner region, and/or a right lip region.

In step 404, Feature Extraction Engine 106 may determine personality traits for local and global anatomical features. Whereas local anatomical features may be derived from a single physical region determined in step 403, global anatomical features such as ear symmetry or eye symmetry may require information from two or more physical regions. To determine personality traits, Feature Extraction Engine 106 may associate a personality factor with each feature based on a geometrical representation of the feature. In certain embodiments, Feature Extraction Engine 106 may determine a geometrical representation of a feature using an edge image, where the shape of the feature is defined by one or more edges in the edge image. For example, Feature Extraction Engine 106 may convert a physical region in still image input corresponding to an eye to an edge image, where all edges in the edge image may define a geometrical representation of the eye. In other embodiments, a geometrical representation of an anatomical feature may comprise one or more template variables and one or more mapping functions. For example, template variables associated with an eye may include a coordinate $(x_c, y_c)$ and a radius r that define a geometrical representation of the iris of the eye using the mapping equation $r <= sqrt((x-xc)^2+(y-yc)^2)$. Feature Extraction Engine 106 may determine a geometrical representation of the eye by minimizing an image potential function based on the template variables and grayscale intensity of the physical region corresponding to the eye. Feature Extraction Engine may use other algorithms and/or techniques to determine a geometrical representation of a feature, for example contour mapping or principal component analysis.

Feature Extraction Engine 106 may determine a personality factor to associate with an anatomical feature based on the geometrical representation of the feature. In certain embodiments, personality factors may comprise one or more personality traits, i.e., a vector of personality traits, and Feature Extraction Engine 106 may determine the vector of personality traits using a vector function. The vector function may determine the vector of personality traits based on, for example, the one or more template variables of a geometrical representation.

Importantly, embodiments of the present disclosure may be adapted to determine personality traits (and ultimately, identify a personality) of a human subject for an arbitrary psychometric personality system. For example, the Myers-Briggs personality system uses personality traits defined by four axes of dichotomous relationships: extraversion-intraversion, sensing-intuition, thinking-feeling, judging-perceiving. Based on the these axes, the standard Myers-Briggs personality system defines at least sixteen personality archetypes (or personalities) where a given human subject is either extraverted or introverted, sensing or intuitive, thinking or feeling, judging or perceptive. A variation of the Myers-Briggs personality may score a human subject on each of the axes. For example, a human subject may be assigned a score ranging from 0 to 100 for scales of intraversion, intuition, feeling, and perceiving, where score of zero on one scale corresponds to one dichotomy (e.g. absolutely extraverted), and a score of 100 on the same scale corresponds to the other dichotomy (absolutely introverted). This scoring system provides $100^4$ potential personalities that may be determined for a human subject, a number which may be reduced by choosing more coarse-grained scoring system, e.g. scoring an axis from 0 to 5. Another psychometric system, the "Big Five" system, defines five broad personality traits: openness, conscientiousness, extraversion, agreeableness, and neuroticism, each of which may be broken down in clusters of subtraits.

Embodiments of the present disclosure may be adapted to arbitrary psychometric personality systems by observing that a personality system having N personality traits and/or subtraits (for the Myers-Briggs system, N=4, and for the Big Five system, N>=5) defines a finite N-dimensional space of human personality. Dividing the finite N-dimensional space into regions by choosing an appropriate scale for each of the personality traits may be used to define an arbitrary number of personalities or personality archetypes. Thus, embodiments of the present disclosure may be adapted to determine personality traits for local and global anatomical features in an arbitrary psychometric personality system by appropriately setting the dimensionality of the vector of personality traits and determining an appropriate scale for each dimension. For example, an embodiment of the present disclosure adapted to the standard 16-personality Myers-Briggs system may determine a personality factor comprising a vector of personality traits of dimensionality 4 (each dimension corresponding to a Myers-Briggs axis), where each dimension may take on a value of −1 or 1 (where −1 and 1 correspond to the opposing dichotomous traits of the corresponding Myers-Briggs axis). Accordingly, Feature Extraction Engine 106 may determine a personality factor based on a geometrical representation of a feature based on a vector function that maps one or more template variables of the geometrical representation to a value on the scale (−1 or 1) for each dimension.

If Feature Extraction Engine 106 determines that the validated visual data comprises validated video input (step 402; "Video"), Feature Extraction Engine 106 may extract one or more regions in the validated video input, for example, using metadata associated with the validated video input by Validation Engine 105. Thus, for example, Feature Extraction Engine 106 may determine a face region in the validated video input (step 405; "Face"), a shoulder region in the validated video input (step 405; "Shoulder"), and a hip region in the validated video input (step 405; "Hip"). Based on the extracted region, Feature Extraction Engine 106 may perform different operations to determine more personality traits for features extracted from validated video input. As shown in FIG. 4, Feature Extraction Engine 106 may determine personality traits for a face region in video input (step 405: "Face") by splitting the face region video input into single frames and then one or more personality traits using steps 403 and 404. Analogous steps may be performed on a shoulder region in the validated video input—for example, Feature Extraction Engine 106 may split the shoulder region video input into single frames and detect one or more anatomical features of the human subject by, for example, sectioning the shoulder region using an image recognition algorithm to determine one or more physical regions corresponding to the one or more anatomical features. Feature Extraction Engine 106 may associate a personality factor with each one or more anatomical feature. The physical regions and corresponding anatomical features may include at least one of a hand region, a nail region, a wrist region, an elbow region, a chest region, an abdominal region, a collarbone region, a bicep region, a tricep region, and/or a forearm region, etc.

If Feature Extraction Engine 106 determines that validated visual data comprises validated gait-based input (step 402; "Gait based") and/or if validated video input data comprises a region from which gait-based input may be extracted, e.g. a hip region (step 405, "Hip"), Feature Extraction Engine 106 may determine one or more personality traits based on gait analysis (step 407), for example, by extracting a movement pattern of the human subject from the validated gait-based input, and associating a personality factor with the extracted the movement pattern.

Extracting a movement pattern from the gait-based input may comprise splitting the gait-based input into one or more segments of motion capture data. For example, Feature Extraction Engine 106 may split the gait-based input into single frames of motion capture data. Alternatively, the Feature Extraction Engine 106 may split the gait-based input into segments corresponding to difference phases of a gait cycle. A gait cycle may, for example, include a first phase in which mainly the right side of the human subject is moving, and a second phase in which mainly the left side of the human subject is moving. Thus, Feature Extraction Engine 106 may extract a movement by splitting the gait-based input into the left-right-left-right-etc. cycles.

In certain embodiments, associating a personality factor with the extracted the movement pattern may comprise determining a personality factor based on a hidden Markov model algorithm (HMM algorithm). For example, database 110 may store one or more hidden Markov models (HMMs) that correspond to one or more personality archetypes, e.g., as defined by a region in the finite N-dimensional space of human personality for a particular psychometric personality system. Each HMM corresponding to a personality archetype may comprise a state transition probability matrix and observation probability matrix that may be determined by training the HMM using gait-based input associated with a known personality archetype. The observation sequence of the HMM algorithm may comprise the extracted movement pattern, e.g., the one or more segments of motion capture data. Thus, Feature Extraction Engine 106 may determine a personality archetype for the extracted movement patterns based on an HMM algorithm that determines which HMM of the one or more HMMs corresponding to one or more personality archetypes maximizes the probability of observing the extracted movement pattern. Based on the determined personality archetype, Feature Extraction Engine 106 may determine a personality factor to associate with the movement pattern, for example, by determining the centroid of the N-dimension region corresponding to the personality archetype. Feature Extraction Engine 106 may also determine the one or more HMMs corresponding to personality archetypes based on the one or more demographic attributes determined by Validation Engine 105. For example, Feature Extraction Engine may use a different set of HMMs to determine a personality factor associated with a movement pattern of a female human subject than for a movement pattern of a male human subject.

In step 408, the determined personality traits associated with the one or more anatomical features and/or movement patterns may be forwarded by Feature Extraction Engine 106 to Personality Prediction Engine 107 for identification of the human subject's personality. For example, Feature Extraction Engine 106 may store the geometrical representations of the one or more anatomical features, the extracted movement patterns, and/or the one or more personality factors associated with the one or more anatomical features and/or movement patterns in database 110 for retrieval by Personality Prediction Engine 107.

Personality Identification

As shown in FIG. 2 step 203, a method in accordance with the present disclosure may include identifying a personality of human subject based on correlations between personality traits from anatomical features and/or movement patterns extracted from still image and/or movement input, e.g., the one or more personality factors associated with the one or more anatomical features and/or movement patterns determined by Feature Extraction Engine 106.

A difficulty in identifying a personality of a human subject based on personality traits associated with multiple anatomical features and/or movement patterns is that the personality traits for difference features and/or movement patterns may conflict and/or point to different personalities. Certain traits may also be more accurately expressed in certain features and/or movement patterns, and thus should be given greater weight. Accordingly, the actual personality of a human subject may not simply be determined based on an additive effect of the one or more personality traits, e.g., summing the one or more vectors of personality traits of the one or more personality factors.

Thus, in certain embodiments, identifying a personality of the human subject may comprising determining a personality based on a HMM algorithm and one or more HMMs corresponding to one or more personalities. For example, database 110 may store one or more HMMs that correspond to one or more personalities, e.g., as defined by a region in the finite N-dimensional space of human personality for a particular psychometric personality system. Each HMM corresponding to a personality may comprise a state transition probability matrix and observation probability matrix that may be determined by training the HMM using human subjects having known personality. The observation sequence of the HMM algorithm may comprise a sequence of personality factors associated with anatomical features and/or movement patterns of the human subject. For example, an observation sequence may comprise a personality factor associated with the human subject's nose, followed by a personality factor associated with the human subject's mouth, followed by a personality factor associated with a the human subject's eyebrow, etc. Personality Prediction Engine 107 may identify a personality of the human subject based on the observation sequence and an HMM algorithm that determines which HMM of the one or more HMMs corresponding to a personality maximizes the probability of observing the sequence of personality factors associated with anatomical features and/or movement patterns of the human subject. Personality Prediction Engine 107 may also determine the one or more HMMs corresponding to one or more personalities based on the one or more demographic attributes determined by Validation Engine 105. For example, Personality Prediction Engine 107 may use a different set of HMMs to determine a personality of a female human subject than for a male human subject. Personality Prediction Engine 107 may also determine a confidence that the identified personality reflects the human subject's true personality. For example, Personality Prediction Engine 107 may determine a confidence based on or equal to the probability of observing the observation sequence for the HMM that maximizes the probability of observing the sequence of personality factors.

Providing a Recommendation

As shown in FIG. 2 step 204, a method in accordance with the present disclosure may include providing a recommendation based on the identified personality, for example, a recommendation to purchase a service or product of a business. Embodiments in accordance with the present disclosure may determine which product or service to recommend based on business intelligence correlating a personality with a product or service that a human subject having the personality is most likely to purchase. For example, a book seller may determine that certain personalities prefer books of a certain genre. Accordingly, system 101 may store in database 110 a recommendation matrix mapping a given personality to a latest best-selling book in a genre most preferred by human subjects having the given personality.

Accordingly, based on the personality of a human subject identified by Personality Prediction Engine 107 and a recommendation matrix stored in database 110, Recommendation Engine 108 may provide a recommendation to the human subject to purchase a latest best-selling book in a genre most preferred by the personality of the human subject. Recommendation Engine 108 may further determine which recommendation matrix to use based on the one or more demographic attributes of the human subject determined by Validation Engine 105. For example, Recommendation Engine 108 may use a different recommendation matrix to determine recommendations for human subjects determined to be in a younger age range than a human subject determined to be in an older age range.

Recommendation Engine 108 may use one or more human-machine interfaces to provide the recommendation including, for example, at least one of a graphical user interface (GUI) and/or other I/O devices (e.g., an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, printer, fax machine, video display (e.g., cathode ray tube (CRT), liquid crystal display (LCD), light-emitting diode (LED), plasma, or the like), audio speaker, etc.).

In certain embodiments, system 101 may be configured to provide a real-time recommendation to the human subject. Thus, for example, Service Layer 102 and the one or more human-machine interfaces of Recommendation Engine 108 may be integrated into a kiosk in which system 101 may use an output device, e.g. a video display and/or an audio speaker, to prompt the human subject to approach the kiosk. Using a video camera, e.g. a web camera, mounted to the kiosk, Service Layer 102 may obtain visual data based on which system 101 may identify a personality of the human subject. Recommendation Engine 108 may determine a recommendation to provide to the human subject and provide the recommendation to the human subject using the output device of the kiosk. For example, Recommendation Engine 108 may present an array of books to a human subject using a GUI shown on a video display, and may provide a recommendation by highlighting a recommended book.

Feedback and Machine Learning

As shown in FIG. 2 step 205, a method in accordance with the present disclosure may comprise improving the accuracy of the identified personality and/or provided recommendation based on feedback from the human subject. Feedback may comprise, for example, whether or not the human subject adhered the provided recommendation by purchasing the recommended product and/or service. In certain embodiments, system 101 may be configured to permit purchase of the recommended product and/or service (or other products and/or services), and determining whether or not the human subject adhered the provided recommendation may comprise determining whether the human subject purchased the recommended product and/or service using system 101. Feedback may also be determined from visual data obtained by Service Layer 102. Thus, for example, after system 101 presents purchase options to the subject using a GUI and Recommendation Engine 108 provides a recommendation by highlighting one of the purchase options based on an identified personality of the human subject, Feedback Engine 109 may collect feedback based on visual data collected by Service Layer 102, e.g., by using a gaze-detection algorithm that determines an amount of time the human subject spent gazing at the recommended product from the visual data collected by Service Layer 102. Feedback Engine 109 may normalize the collected feedback, for example, normalizing the amount of time spent gazing at the recommended product relative to amounts of time spent gazing a non-recommended products.

Feedback showing that the human subject did not adhere to the recommendation may indicate either that 1) the recommendation was inaccurately determined based on accurate identification of the human subject's personality, or that 2) the recommendation was accurately provided but based on an inaccurate identification of the human subject's personality. Feedback Engine 109 may accordingly fix either the provided recommendation or the identified personality as being accurate.

Feedback Engine 109 may provide the collected feedback to Recommendation Engine 108, Personality Prediction Engine 107, and/or Feature Extraction Engine 106, which may use the collected feedback to improve the accuracy of the identified personality and/or provided recommendation using machine-learning algorithms. Thus, for example, if the collected feedback indicates that system 101 inaccurately identified the human subject's personality, Personality Prediction Engine 109 may retrain the hidden Markov model corresponding to the inaccurately identified personality using an expanded training set. The expanded training set may comprise the observation sequence used by the HMM to determine the inaccurate personality. As another example, if the collected feedback indicates that the recommendation was inaccurately provided, Recommendation Engine 108 may use a machine learning algorithm to update the recommendation matrix used to generate the recommendation.

Exemplary Computer System

Figure 5:
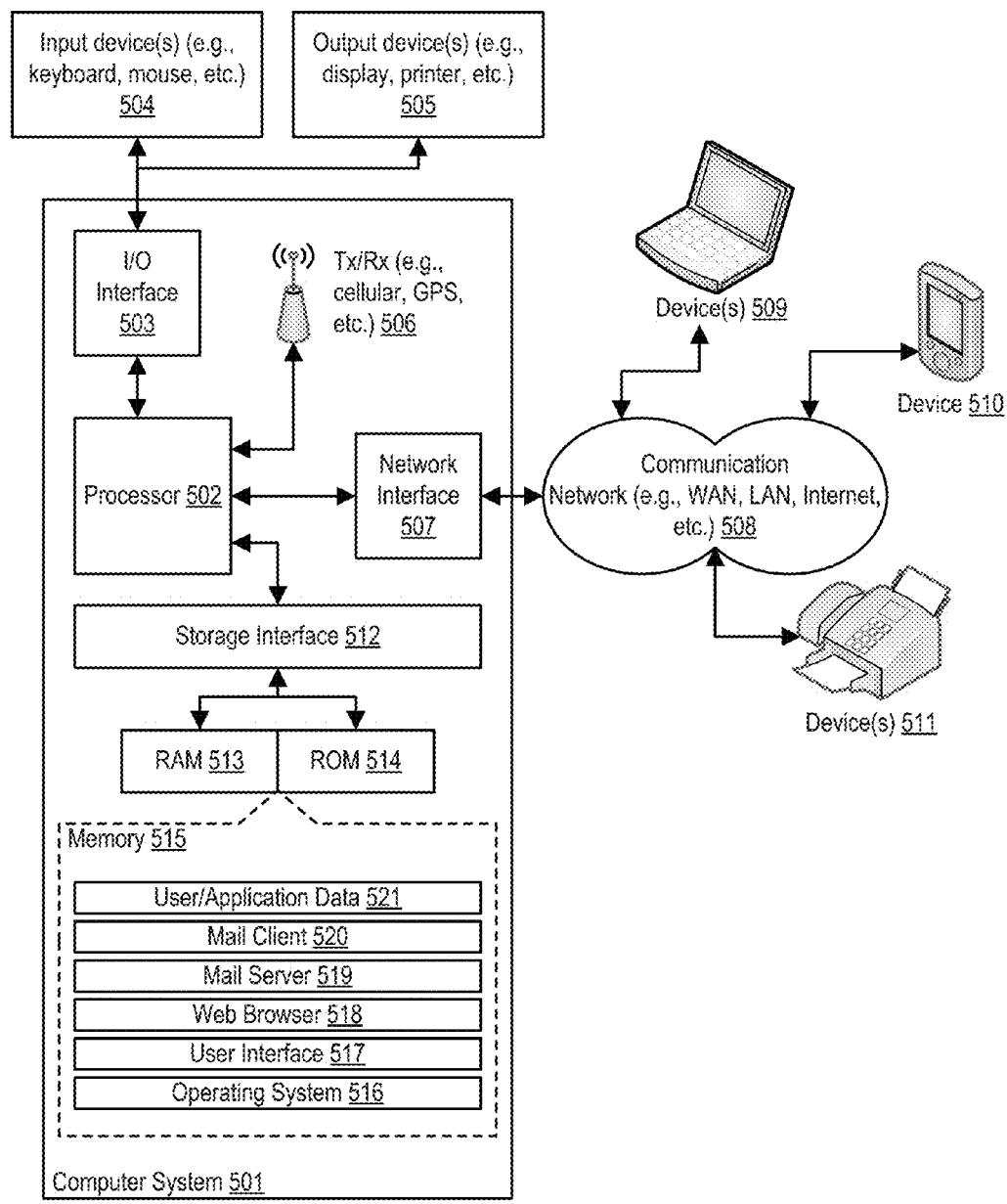
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing any of the devices and/or device components presented in this disclosure, including system 101. Computer system 501 may comprise a central processing unit (CPU or processor) 502. Processor 502 may comprise at least one data processor for executing program components for executing user- or system-generated requests. A user may include a person using a device such as such as those included in this disclosure or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 518-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for identifying a personality of a human subject comprising:
    one or more hardware processors; and
    a computer-readable medium storing instructions that, when executed by the one or more hardware processors, cause the one or more hardware processors to perform operations comprising:
        receiving visual data of the human subject from one or more hardware sensors;
        validating the visual data using a facial recognition algorithm, wherein the validation of the visual data comprises: after determining that the visual data comprises an image of a distorted anatomical feature, correcting the distorted anatomical feature in the visual data;
        detecting at least one anatomical feature of the human subject from the validated visual data, wherein detecting the at least one anatomical feature of the human subject comprises:
            locating a physical region corresponding to each of the at least one anatomical feature in the validated visual data,
            extracting a geometrical representation of each of the at least one anatomical feature from the physical region, and
            associating a first personality factor with each of the at least one anatomical feature, wherein the first personality factor is determined based on the geometrical representation of the anatomical feature; and
        determining the personality of the human subject based on the first personality factor associated with each of the detected at least one anatomical feature using a hidden Markov model algorithm, and a plurality of hidden Markov models each of which corresponding to a plurality of personalities by:
            determining a hidden Markov model from the plurality of hidden Markov models that maximizes a probability of observing a sequence of first personality factors associated with the detected anatomical features, and
            determining the personality from a plurality of personalities corresponding to the determined hidden Markov model by determining a centroid of a N-dimension region corresponding to the plurality of personalities corresponding to the determined hidden Markov model.

2. The system according to claim 1, wherein the operation of validating the visual data further comprises determining a gender of the human subject based on a support vector machine algorithm.

3. The system according to claim 2, wherein the medium stores further instructions that, when executed by the one or more hardware processors, cause the one or more hardware processors to perform operations comprising:
    determining the plurality of hidden Markov models based on the gender of the human subject.

4. The system according to claim 1, wherein the medium stores further instructions that, when executed by the one or more hardware processors, cause the one or more hardware processors to perform operations comprising:
    extracting at least one movement pattern of the human subject from the visual data, and
    associating a second personality factor with each of the extracted at least one movement pattern,
    wherein determining the personality of the human subject comprises determining the personality of the human subject based on the first personality factor associated with each of the detected at least one anatomical feature and the second personality factor associated with each of the extracted at least one movement pattern using a hidden Markov model algorithm and a plurality of hidden Markov models corresponding to a plurality of personalities by:
        determining a hidden Markov model from the plurality of hidden Markov models that maximizes a probability of observing a sequence of first personality factors associated with the detected anatomical features and of second personality factors associated with the extracted movement patterns.

5. The system accordingly to claim 4, wherein the at least one movement pattern includes a gait of the human subject.

6. The system according to claim 4, wherein the second personality factor associated with each of the extracted at least one movement pattern is determined based on a hidden Markov model algorithm.

7. The system according to claim 4, wherein the first personality factor and the second personality factor comprise one or more weighted personality traits, and wherein the personality of the human subject is determined based on correlations between the personality factors associated with each of the detected at least one anatomical feature and each of the extracted at least one movement pattern, the correlations being obtained from the one or more weighted personality traits.

8. The system according to claim 1, wherein the medium stores further instructions that, when executed by the one or more hardware processors, cause the one or more hardware processors to perform operations comprising:
    providing a real-time recommendation for a product to the human subject based on the determined personality of the human subject.

9. The system according to claim 8, wherein the medium stores further instructions that, when executed by the one or more hardware processors, cause the one or more hardware processors to perform operations comprising:

receiving feedback via a computing device associated with the human subject; and improving the real-time recommendation based on at least a machine-learning algorithm and the received feedback.

10. The system according to claim 9, wherein the received feedback comprises an amount of time the human subject observed the recommendation for the product.

11. The system according to claim 1, wherein the correction of the distorted anatomical feature in the visual data comprises:

extracting a first field corresponding to one or more peaks in image intensity of the distorted anatomical feature;

extracting a second field corresponding to one or more valleys in image intensity of the distorted anatomical feature;

extracting a third field corresponding to one or more edges of image intensity of the distorted anatomical feature; and correcting the distorted anatomical feature based on an image potential function and the first, second, and third fields.

12. A non-transitory computer-readable medium storing instructions for identifying a personality of a human subject that, when executed by one or more hardware processors, cause the one or more hardware processors to perform operations comprising:

receiving visual data of the human subject from one or more hardware sensors;

validating the visual data using a facial recognition algorithm, wherein the validation of the visual data comprises: after determining that the visual data comprises an image of a distorted anatomical feature, correcting the distorted anatomical feature in the visual data;

detecting at least one anatomical feature of the human subject from the validated visual data, wherein detecting the at least one anatomical feature of the human subject comprises:

locating a physical region corresponding to each of the at least one anatomical feature in the validated visual data, extracting a geometrical representation of each of the at least one anatomical feature from the physical region, and associating a first personality factor with each of the at least one anatomical feature, wherein the first personality factor is determined using the geometrical representation of the anatomical feature; and determining the personality of the human subject based on the first personality factor associated with each of the detected at least one anatomical feature using a hidden Markov model algorithm, and a plurality of hidden Markov models each of which corresponding to a plurality of personalities by:

determining a hidden Markov model from the plurality of hidden Markov models that maximizes a probability of observing a sequence of first personality factors associated with the detected anatomical features, and determining the personality from a plurality of personalities corresponding to the determined hidden Markov model by determining a centroid of a N-dimension region corresponding to the plurality of personalities corresponding to the determined hidden Markov model.

13. The non-transitory computer-readable medium according to claim 12, wherein the operation of validating the visual data further comprises determining a gender of the human subject based on a support vector machine algorithm.

14. The non-transitory computer-readable medium according to claim 12, wherein the medium stores further instructions that, when executed by the one or more hardware processors, cause the one or more hardware processors to perform operations comprising:

extracting at least one movement pattern of the human subject from the visual data, and associating a second personality factor with each of the extracted at least one movement pattern, and wherein determining the personality of the human subject comprises determining the personality of the human subject based on the first personality factor associated with each detected at least one anatomical feature and the second personality factor associated with each of the extracted at least one movement pattern using a hidden Markov model algorithm and a plurality of hidden Markov models corresponding to a plurality of personalities by:

determining a hidden Markov model from the plurality of hidden Markov models that maximizes a probability of observing a sequence of first personality factors associated with the detected anatomical features and of second personality factors associated with the extracted movement patterns.

15. The non-transitory computer-readable medium according to claim 14, wherein the at least one movement pattern includes a gait of the human subject.

16. The non-transitory computer-readable medium according to claim 14, wherein the second personality factor associated with each of the extracted at least one movement pattern is determined based on a hidden Markov model algorithm.

17. The non-transitory computer-readable medium according to claim 14, wherein the first personality factor and the second personality factor comprise one or more weighted personality traits, and wherein the personality of the human subject is determined based on correlations between the personality factors associated with each of the detected at least one anatomical feature and each of the extracted at least one movement pattern, the correlations being obtained from the one or more weighted personality traits.

18. The non-transitory computer-readable medium according to claim 12, wherein the medium stores further instructions that, when executed by the one or more hardware processors, cause the one or more hardware processors to perform operations comprising:

providing a real-time recommendation for a product to the human subject based on the determined personality of the human subject.

19. The non-transitory computer-readable medium according to claim 18, wherein the medium stores further instructions that, when executed by the one or more hardware processors, cause the one or more hardware processors to perform operations comprising:

receiving feedback via a computing device associated with the human subject; and improving the real-time recommendation based on at least a machine-learning algorithm and the received feedback.

20. A method for identifying a personality of a human subject comprising:
- receiving, using one or more hardware processors, visual data of the human subject from one or more hardware sensors;
- validating, using one or more hardware processors, the visual data using a facial recognition algorithm, wherein the validation of the visual data comprises:
  - after determining that the visual data comprises an image of a distorted anatomical feature, correcting the distorted anatomical feature in the visual data;
- detecting, using one or more hardware processors, at least one anatomical feature of the human subject from the validated visual data, wherein detecting the at least one anatomical feature of the human subject comprises:
  - locating a physical region corresponding to each of the at least one anatomical feature in the validated visual data,
  - extracting a geometrical representation of each of the at least one anatomical feature from the physical region, and
  - associating a first personality factor with each of the at least one anatomical feature, wherein the first personality factor is determined using the geometrical representation of the anatomical feature; and
- determining, using one or more hardware processors, the personality of the human subject based on the first personality factor associated with each of the detected at least one anatomical feature using a hidden Markov model algorithm, and a plurality of hidden Markov models each of which corresponding to a plurality of personalities by:
  - determining a hidden Markov model from the plurality of hidden Markov models that maximizes a probability of observing a sequence of first personality factors associated with the detected anatomical features, and
  - determining the personality from a plurality of personalities corresponding to the determined hidden Markov model by determining a centroid of a N-dimension region corresponding to the plurality of personalities corresponding to the determined hidden Markov model.

21. The method according to claim 20, wherein validating, using one or more hardware processors, the visual data further comprises determining a gender of the human subject based on a support vector machine algorithm.

22. The method according to claim 20, further comprising:
- extracting, using one or more hardware processors, at least one movement pattern of the human subject from the visual data, and
- associating, using one or more hardware processors, a second personality factor with each of the extracted at least one movement pattern, and
- wherein determining the personality of the human subject comprises determining the personality of the human subject based on the first personality factor associated with each of the detected at least one anatomical feature and the second personality factor associated with each of the extracted at least one movement pattern using a hidden Markov model algorithm and a plurality of hidden Markov models corresponding to a plurality of personalities by:
  - determining a hidden Markov model from the plurality of hidden Markov models that maximizes a probability of observing a sequence of first personality factors associated with the detected anatomical features and of second personality factors associated with the extracted movement patterns.

23. The method according to claim 22, wherein the at least one movement pattern includes a gait of the human subject.

24. The method according to claim 22, wherein the second personality factor associated with each of the extracted at least one movement pattern is determined based on a hidden Markov model algorithm.

25. The method according to claim 22, wherein the first personality factor and the second personality factor comprise one or more weighted personality traits, and wherein the personality of the human subject is determined based on correlations between the personality factors associated with each of the detected at least one anatomical feature and each of the extracted at least one movement pattern, the correlations being obtained from the one or more weighted personality traits.

26. The method according to claim 20, wherein the operations further comprise providing, using one or more hardware processors, a real-time recommendation for a product to the human subject based on the determined personality of the human subject.

27. The method according to claim 26, further comprising:
- receiving, using one or more hardware processors, feedback via a computing device associated with the human subject; and
- improving, using one or more hardware processors, the real-time recommendation based on at least a machine-learning algorithm and the received feedback.

* * * * *